United States Patent

Duda et al.

[15] 3,686,767

[45] Aug. 29, 1972

[54] TAPE MEASURE AND RULE

[72] Inventors: Werner Duda, 129 Weaver Road, West Sayville, N.Y. 11796; Robert Carter, 5 John St., Shoreham, N.Y. 11786

[22] Filed: May 12, 1970

[21] Appl. No.: 36,516

[52] U.S. Cl. ....................................33/138, 242/84.8
[51] Int. Cl. ...........................G01b 3/02, B65h 75/16
[58] Field of Search .........................33/138; 242/84.8

[56] References Cited

UNITED STATES PATENTS

| | | | |
|---|---|---|---|
| 3,191,308 | 6/1965 | Lindenau | 33/138 |
| 2,312,943 | 3/1963 | Van Buskirk | 33/138 |
| 3,435,529 | 4/1969 | Quenot | 33/138 |

FOREIGN PATENTS OR APPLICATIONS

| | | | |
|---|---|---|---|
| 1,548,496 | 10/1968 | France | 242/84.8 |

*Primary Examiner*—Leonard Forman
*Assistant Examiner*—Steven L. Stephan
*Attorney*—Curtis, Morris and Safford

[57] ABSTRACT

A tape measure having a reel and an outer casing. The outer casing is generally elliptically shaped and is adapted to be held in the hand with the tape extending tangentially from the reel through a generally elongated slot in a sector of its elliptical peripheral wall portion intermediate the minor and major axes of the casing. This construction permits the tape to be withdrawn from the casing along a line which extends substantially parallel to the major axes of the casing without bending of the tape.

10 Claims, 3 Drawing Figures

INVENTORS
Werner Duda
Robert Carter
BY
Curtis, Morris & Safford
ATTORNEYS

TAPE MEASURE AND RULE

This invention relates generally to flexible tape measures, and more particularly to tape measures of the type in which a flexible steel tape or rule is wound on a reel mounted for rotation within a casing to dispense and rewind the tape.

Tape measures and rules of the above type have previously been proposed wherein a take-up reel having a rule or tape wound thereon is mounted for rotation within a flat round casing having a slot on its peripheral wall through which the tape extends such that the tape may be withdrawn from the casing for measuring purposes and thereafter be returned to its wound position within the casing. Appropriate handle or winding mechanisms are generally provided in order to dispense and rewind the tape about the reel within the casing.

Typically, when a round tape measure casing of this type is held in a person's hand during the measuring operation, the tape moves against the sides of the slot in order for the tape to be extended in a straight line appropriate for accurate measurement, and there is bending of the tape at the slot edge. This generally requires the provision of rollers adjacent the edges of the slot to reduce objectionable friction and wear, and to facilitate bending and movement of the tape through the slot. When such rollers are not provided and direct contact is permitted between the tape and the slot edges the rule is subjected to objectionable wear and the calibrations or indicia thereon are worn off. In addition, the bending of the tape adjacent the slot opening, even in rules provided with rollers adjacent the slot, subjects the tape to undesirable stresses and thus shortens the useful life of the tape since these stresses will deteriorate the tape structure and increase the possibility of tape breakage.

Other previously proposed tape measures and rules have provided a tape reel rotatably mounted in a generally rectangular casing whereby the tape is withdrawn adjacent a corner of the casing perpendicular to one wall there of so that it will extend straight from the housing. While this construction avoids bending of the tape adjacent the peripheral slot in the casing, the tape is generally directed over at least one roller within the casing to guide it through the slot and thus the tape is subjected to the same wear and stress problems at this point within the casing as are tapes contained within round casings as discussed above.

Accordingly, it is an object of the present invention to increase the useful life of flexible tape measures and rules. It is another object of the invention to provide a tape measure and rule in which the deleterious effects of tape bending and scraping are eliminated. Still another object of the invention is to reduce the incidence of breakage of flexible tape measures and rules. A further object of the invention is to provide a new and improved measuring apparatus, utilizing comparatively simple components, which is economical to manufacture and assemble and which is reliable in operation.

In accordance with an aspect of this invention a tape measure and rule is provided which has an annular take-up reel rotatably mounted within a generally elliptically shaped housing having a peripheral wall portion including an elongated slot through which a tape, wound on the reel, may be withdrawn for measuring purposes. The elongated slot is located in a sector of the peripheral wall portion intermediate the major and minor axes of the casing so that the tape is withdrawn along a line which is substantially parallel to the major axis of the casing. By this construction the tape is withdrawn along a generally straight line and is not bent against or in contact with the edges of the peripheral slot and moreover no guide rollers or surfaces need to be utilized to produce this result. The tape measure is constructed so that portion of the annular tape reel forms an exterior surface of the rule and this surface is provided with a swivelably mounted handle member by which the reel is rotated to rewind the tape thereon after completion of the measuring operation. As with the withdrawal operation, when the tape is rewound it will be moved along a line substantially parallel to the major axis of the outer elliptical casing so that it will not engage the edges of the peripheral wall slot.

The above, and other objects, features and advantages of this invention, will be apparent in the following detail description of the illustrative embodiment of this invention which is to be read in conjunction with the accompanying drawings wherein.

Figures 1, 2, 3:
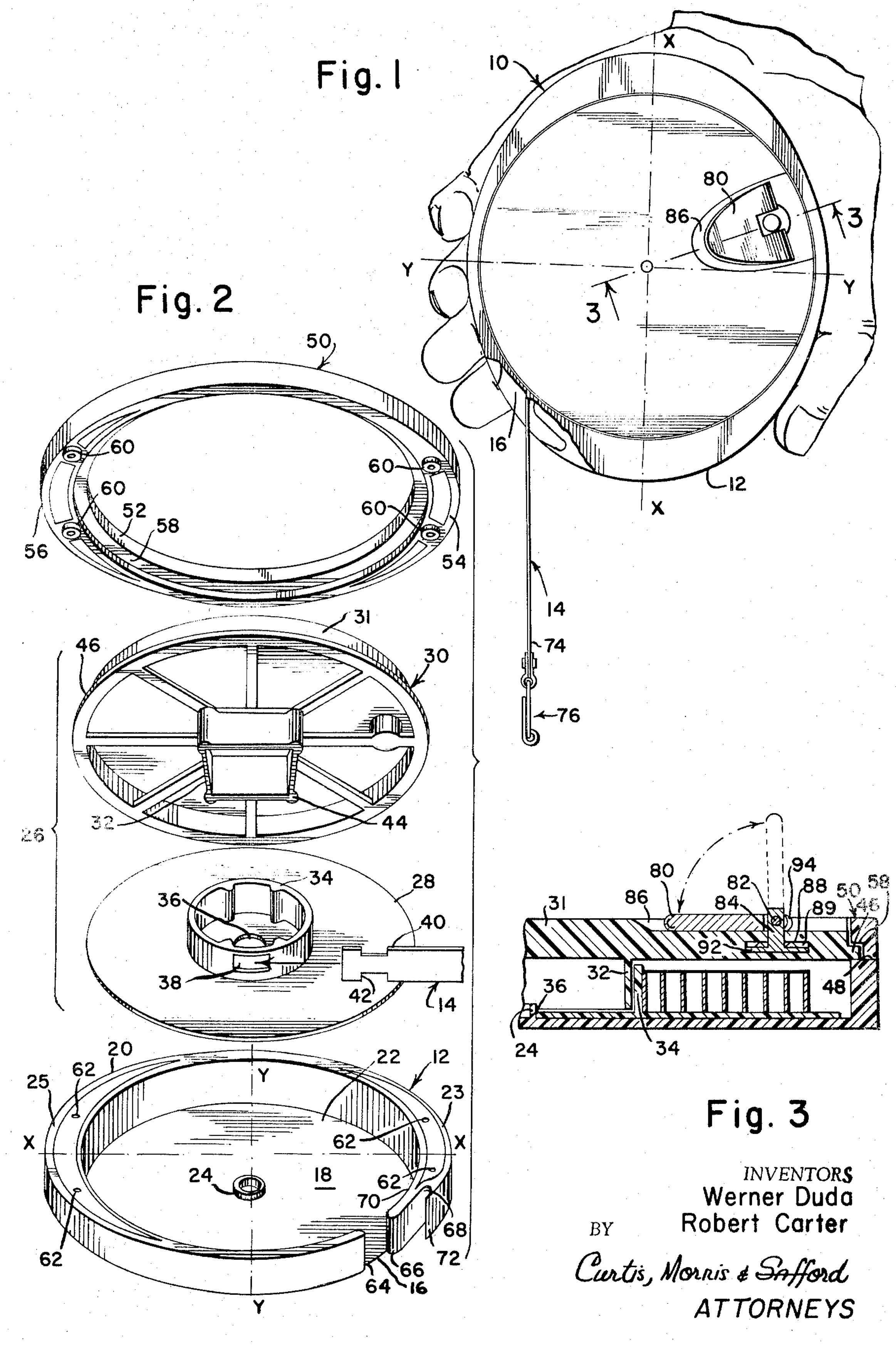
FIG. 1 is a plan view, with parts broken away, of the tape measure and rule according to an embodiment of the present invention, as it is held during use.
FIG. 2 is an exploded perspective view of the components forming the tape measure and rule illustrated in FIG. 1.
FIG. 3 is a partial sectional view taken on lines 3–3 of FIG. 1.

Referring now to the drawings in detail, and initially to FIG. 1 thereof, it will be seen that a tape measure 10 embodying the present invention, as shown therein, comprises a generally elliptical exterior frame 12 which is adapted to be held in the hand in the manner illustrated, to dispense a flexible tape or rule 14 from its interior through slot 16 formed in its peripheral wall.

As seen more clearly in FIG. 2, frame 12 includes a generally flat base portion 18 and an elliptically shaped peripheral wall 20 which defines an interior cavity 22 adapted to rotatably receive reel member 26, which is more fully described hereinafter. Elliptical wall 20 is defined with respect to a major axis X and a minor axis Y, and has an eccentricity which may be approximately 0.2. Wall 20 has diametrically opposed wall portions 23 and 25, whose cross-sectional areas vary about the periphery of base 18 from their largest dimensions at the diametrically opposed points lying on major axis X and decrease from the major axis towards minor axis Y so that central cavity 22 is defined as a generally circular enclosure. Slot 16 is formed in a sector of wall 20 intermediate major and minor axes thereof.

Base portion 18 includes a central stub shaft 24, located at the intersection of axes X and Y, on which the generally circular tape reel 26 is rotatably mounted. Reel 26, on which rule 14 is wound, is formed by a pair of frame members 28 and 30 having hubs 32 and 34 respectively which are adapted to be nested as shown in FIG. 3 to form an integral reel. Member 28 is formed as a flat circular element and has an opening 36 in the central portion thereof which receives stub shaft 24 to rotatably mount the reel thereon.

Hub 34, which is a generally annular member formed integrally with base portion 28 surrounds opening 36 and includes an aperture 38 on the periphery thereof in which one end 40 of tape 14 is inserted to fix that end of the tape with respect to the reel. As seen in FIG. 2, end 40 of tape 14 includes a notched portion 42, which, when end 40 is inserted in aperture 38, is adapted to engage the edges of aperture 38 to retain the tape end within hub 34. Tape 14 is wound about hub 34 in a manner more fully described hereinafter.

Reel member 30 is a generally circular element having a flat side wall portion 31 and a hub 36, by which the member 30 is rigidly connected to reel section 28. Hub 36 is a substantially square member having a diagonal dimension which is slightly smaller than the interior diameter of hub 34 on each corner thereof is provided with a generally cylindrical lobe 44 which frictionally engages the interior wall of hub 34 when hub 36 is inserted or nested thereon, to thus form the complete reel member 26 on which rule 14 is wound.

Circular side wall 31 of reel member 30 includes an annular flange 46, more clearly illustrated in FIG. 3, which is adapted to overlie a portion of the top surface 48 of frame member 12 when the reel is inserted in cavity 22 and positioned for rotation on shaft 24. Reel 26 is retained within cavity 22 by bezel member 50 which is a generally oval or elliptically shaped frame member, corresponding substantially to frame member 12, having an inner circular opening 52. Bezel 50 has diametrically opposed end portions 54 and 56 which correspond substantially in dimension to wall portions 23 and 25 of frame member 12 and has an annular interior flange member 58 adjacent opening 52, which, as seen in FIG. 3, is adapted to receive flange 46 of reel portion 30 when bezel 50 is mounted on the frame. A plurality of threaded lobes 60 are provided on bezel 50 which are adapted to mate with holes 62 in frame member 12 so that bezel 50 and frame member 12 may be accurately aligned and permanently mated in their completed configuration by screws (not shown) to rotatably retain reel 26 within frame 12. It is noted that side wall 31 extends through opening 52 in bezel 50 and forms an exterior side of rule 10.

Since the cross-sectional area of wall member 20 increases at points adjacent major axis X, a locking structure can be formed therein to hold the free end of rule 14 within the casing when the rule is not in use. As mentioned above, tape 14 is withdrawn from reel 26 and frame 12 through an aperture 16 located in the peripheral side wall 20 of the frame, at a position on wall portion 23 intermediate the major and minor axes thereof. Slot 16 is defined by beveled edge 64 adjacent minor axis Y and a rounded edge 66 adjacent major axis X; a recessed or undercut portion 68 is formed in wall portion 23 adjacent edge 66, as seen in FIGS. 1 and 2, between an interior wall portion 70 and a narrower exterior wall portion 72 which is adapted to receive and retain therein the free end 74 of tape 14. Tape end 74 is provided with a pivotally mounted anchor 76 of conventional construction which is adapted to be positioned within recess 68 between wall portions 70 and 72 when the tape is fully wound on reel 26. The frictional engagement of the anchor with wall portion 70, 72, holds end 74 within frame 12 and prevents inadvertent dislodgement thereof.

Tape 14 is withdrawn from reel 26 by merely pulling anchor 76 and end 74 from aperture 68 and drawing the tape off the rule. The rotatable mounting of reel 26 on stub shaft 24 permits free rotation of the rule and withdrawal of the tape. In order to rewind tape 14 on completion of the measuring operation, a handle 80 is provided which is pivotally mounted at 82 to swivel member 84 on the exterior surface of side wall 31. Handle 80 is positioned within a recess 86 formed in side wall 31 of reel 30 which has substantially the same configuration as the handle. The latter is adapted to lie generally flat within recess 86 when not in use and is held in this position by annular spring member 88 retained within a cavity 89 formed in wall 31. Spring 88, which, as seen in FIG. 3, may be a conventional spring washer, operates in compression between the top surface of cavity 89 and the flange portion 92 of the swivel. To rewind the tape, handle 80 is pivoted to a generally vertical position wherein it may be grasped between the fingers of the operator to effect rotation of the reel. A friction cam or surface 94 is provided on the base portion of handle 80 adjacent pivot 82 to engage the bottom surface of recess 86 when the handle is in the upright position and provides sufficient friction during the winding operation to stabilize the winding action, and supplement the effect of spring 92, which also tends to stabilize the handle.

It is thus seen that the construction of a tape measure or rule in accordance with the present invention permits flexible tape 14 to be withdrawn from reel 26 along a generally straight line without bending or rubbing of the tape against the edges of slot 16 through which it is withdrawn. The provision of slot 16 in the elliptical wall 20 between the major and minor axes of frame 12 permits the tape to be withdrawn tangentially from the reel along this straight line, so that it extends substantially parallel to the major axis X of the rule and is positioned for use in a measurement operation. Moreover, the oval configuration of the device induces the handler to grasp the device in the manner shown in FIG. 1 to facilitate this straight withdrawal of the tape from the rule. Since tape 14 is neither flexed nor rubbed against the frame of the rule, its life is substantially increased and the surface calibrations on the tape are not damaged or inadvertently removed from the tape by contact with the frame.

It is contemplated that the frame embers of this device may be formed of molded plastic materials which is both inexpensive and durable and that tape 14 may be formed from any of the conventional known tape materials such as cloth, paper or steel.

Although an illustrative embodiment of the invention has been described herein with reference to the accompanying drawings, it is to be understood that the invention is not limited to that precise embodiment, and that various changes and modifications may be effected therein by one skilled in the art without departing from the scope of this invention.

What is claimed is:

1. A tape measuring device adapted to retain and dispense a flexible tape rule, comprising a casing having a generally elliptically shaped base and a peripheral wall extending perpendicularly to said base member defining a cylindrical cavity having an open top; said peripheral wall being curved along its entire length to conform with the peripheral curvature of said elliptical base and having a free edge spaced upwardly from said base, said base having a stub shaft extending into said cavity at the intersection of the base's major and minor axes; a tape rule retaining drum rotatably mounted on said stub shaft and including a first side member having a central aperture for receiving said stub shaft and being surrounded by a hollow hub, and a second side member having a flange overlying a portion of the free edge of said peripheral wall and a hub nested in said hollow hub; a flexible tape rule secured at one end to said hollow hub and being wound thereon; an elliptically shaped peripheral bezel rim mounted on said free edge of said peripheral wall and having an interior groove receiving said flange to retain said drum within said cavity and facilitate rotation thereof, and said peripheral wall having a slot in a sector thereof, intermediate its minor and major axes, and said tape having a free end extending through said slot whereby the tape is wound and unwound through said slot and extends substantially parallel to the major axis of the casing.

2. A device as defined in claim 1 wherein said slot is formed in said wall between a rounded edge portion formed in said wall intermediate said minor and major axes and a beveled edge portion formed in said wall proximate said minor axis.

3. The device as defined in claim 2 including anchor means pivotally mounted on said rule's free end, said peripheral wall including means for retaining said anchor in substantially fixed relation to said wall when said tape is in its fully wound position on said reel.

4. The tape measure device as defined in claim 3 wherein said means for retaining said anchor comprises a peripherally extending depressed section in said wall having one end proximate said major axis and an opposed end contiguous to a portion of said depressed section, said one end defining a notch portion in said peripheral wall adapted to receive and retain one end of said anchor means whereby when said tape is in its fully wound position on said reel, said anchor means is retained in substantially contiguous relation with said depressed section.

5. A device as defined in claim 1 wherein said peripheral wall is formed by a pair of wall sectors having a cross-sectional area which decreases from said major axis to said minor axis whereby said central cavity is defined as a generally circular receptacle for said reel.

6. A device as defined in claim 5 including anchor means pivotally mounted on said rule's free end and said one sector of said wall includes a peripherally extending undercut section substantially larger than and contiguous with said slot and having a notched edge portion adapted to receive one end of said anchor whereby when said tape rule is in its fully wound position on said reel said anchor means is retained in said section.

7. A device as defined in claim 1 including a handle member swivelably mounted on said reel adjacent said flange whereby said reel may be rotated to dispense and retract said tape rule.

8. A device as defined in claim 7 including means for holding said handle in a position perpendicular to said reel to facilitate rotation thereof and for holding said handle in a folded position against said reel when not in use.

9. A device as defined in claim 8 wherein said reel includes a depressed area in which said handle is mounted and which is adapted to receive said handle in said folded position.

10. A device as defined in claim 1 wherein said casing, drum and rim members are formed of plastic.

* * * * *

UNITED STATES PATENT OFFICE
CERTIFICATE OF CORRECTION

Patent No. 3,686,767 Dated August 29, 1972

Inventor(s) Werner Duda and Robert Carter

It is certified that error appears in the above-identified patent and that said Letters Patent are hereby corrected as shown below:

On the title page, after the identification of the inventors, insert:

--[73] Assignee: Justus Roe & Sons, Inc.
Patchogue, New York 11772--

Signed and sealed this 3rd day of April 1973.

(SEAL)
Attest:

EDWARD M.FLETCHER,JR.
Attesting Officer

ROBERT GOTTSCHALK
Commissioner of Patents